United States Patent Office 2,831,759
Patented Apr. 22, 1958

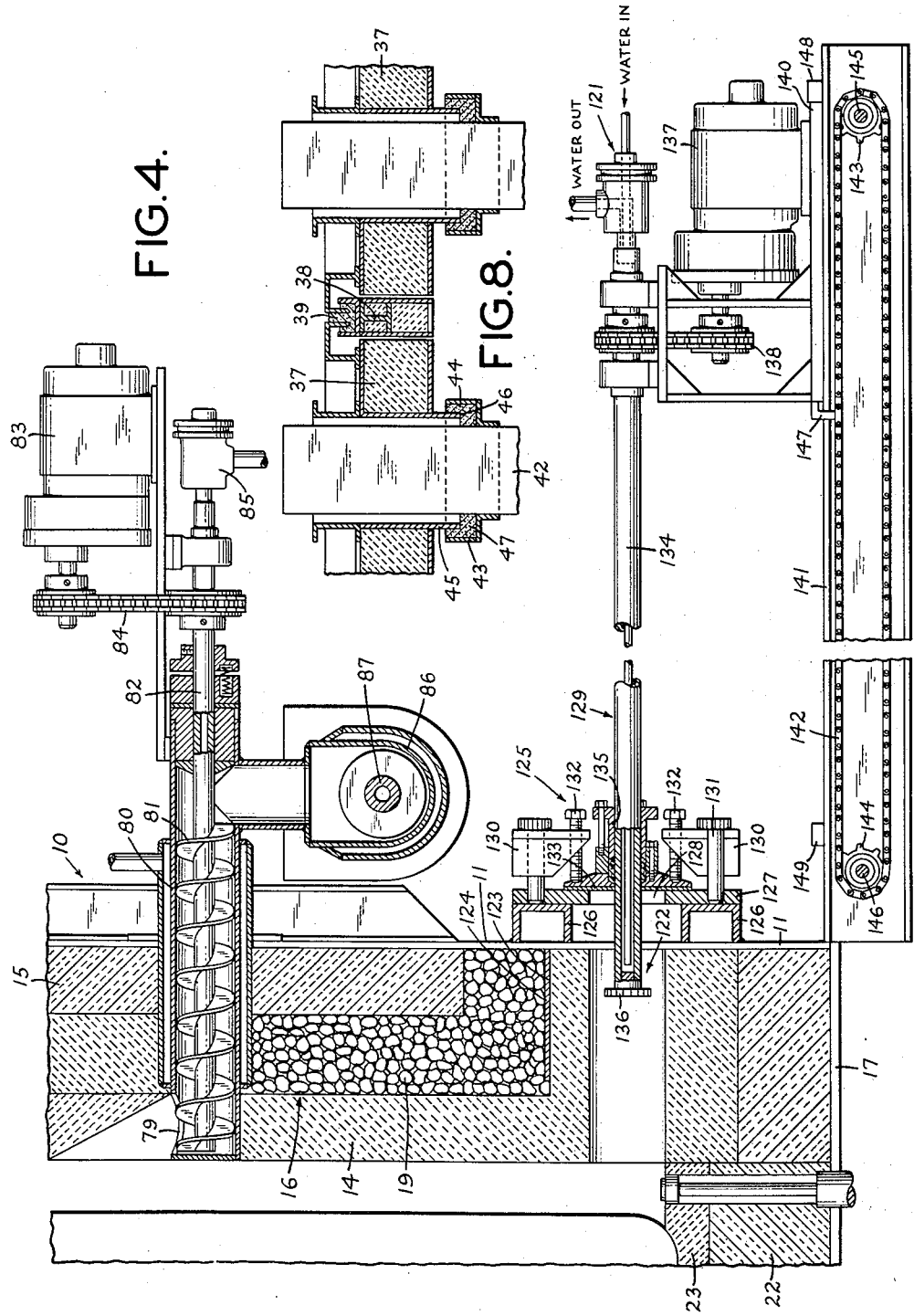

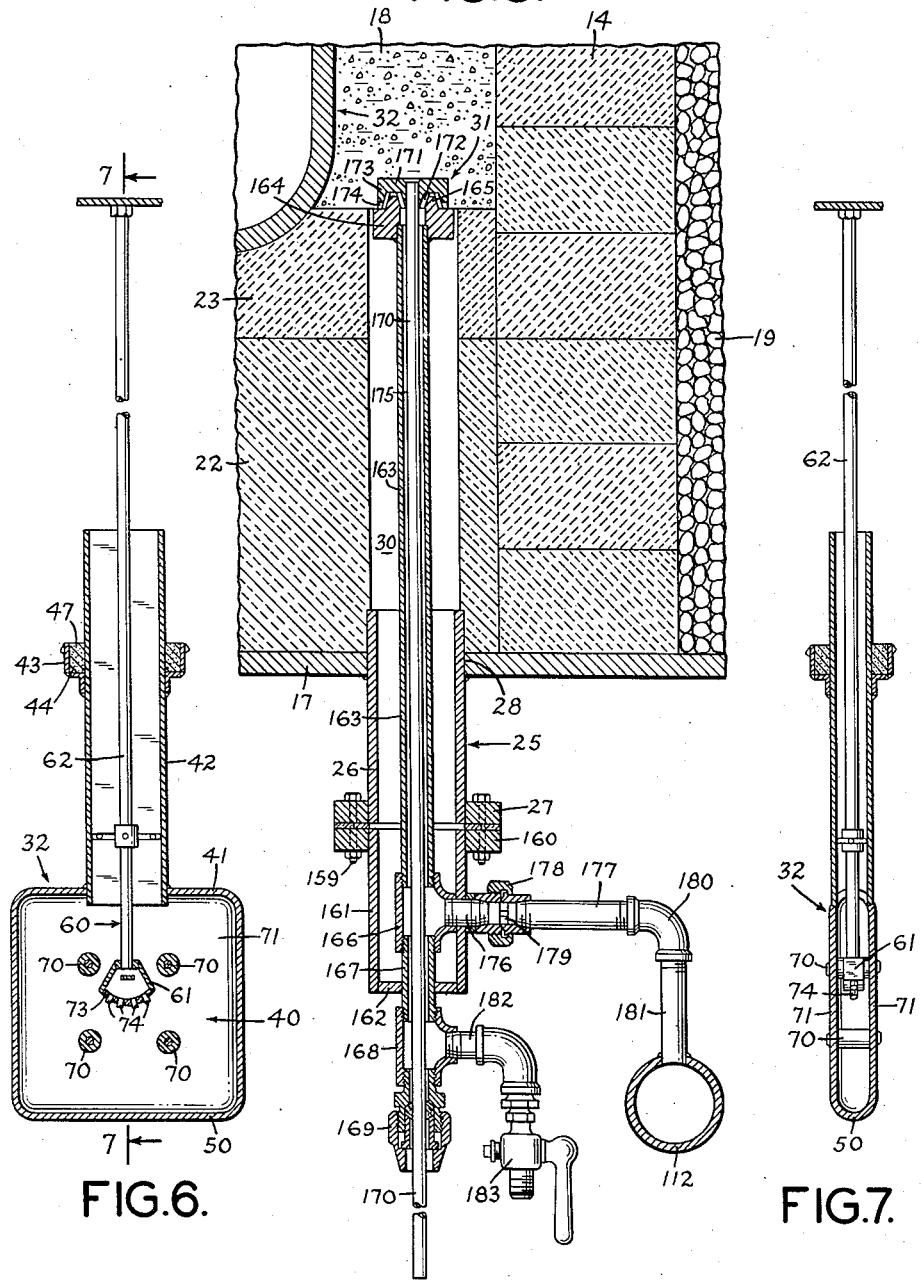

---

2,831,759

APPARATUS AND METHOD FOR PRODUCING SPONGE IRON

William Henry Osborn, New York, N. Y., assignor to Phelps Dodge Corporation, New York, N. Y., a corporation of New York Application October 24, 1956, Serial No. 618,092

15 Claims. (Cl. 75—26)

This invention relates to the production of iron in the form of sponge iron from iron oxide.

When the oxides of iron usually in comminuted form are reduced to the metallic state at temperatures below the melting point of the metal, the product is known as sponge iron. If such comminuted oxides of iron are passed through a furnace chamber in which reducing gases are fed through pipes or tuyeres entering the base of the chamber at such a rate as to maintain the solid particles in a state of suspension while reduction proceeds, the particles flow like a fluid and the process is known as reduction by fluidization.

One difficulty encountered in the gaseous reduction of iron oxides to sponge iron in the past has been due to the fact that when the material is largely reduced to metal, the metal particles tend to stick together to form a loosely adherent mass. When such sticking together occurs in a fluidized bed the bed "sets," fluidization stops, the material ceases to flow out of the reduction chamber and mechanical means have to be devised for its removal.

Another drawback in gaseous reduction of iron oxides to sponge iron has been caused by difficulty in maintaining the temperature of the zone of active reduction sufficiently high for the reduction to continue to relative completion and at an economically rapid rate.

The gases which have heretofore been commonly proposed for use in the reduction of iron oxides to sponge iron are carbon monoxide (CO) and hydrogen ($H_2$) or mixtures of the two. If the primary source of carbon and hydrogen is in such a gas as natural gas (or any other methane gas) it has commonly been proposed to convert this gas in the presence of a catalyst with just sufficient air to form carbon monoxide, hydrogen and nitrogen. If the catalytic combustion chamber is properly constructed, a gas containing approximately one part by volume of carbon monoxide, two parts by volume of hydrogen and two parts of nitrogen with only minor fractions of carbon dioxide, water vapor and unreacted methane can be produced from the average natural gas.

Such a converted gas if introduced at sufficiently elevated temperatures into a bed of sufficiently preheated iron oxides is capable of reducing the iron to metal without introduction of heat from external sources in the reduction chamber itself. The low calorific value gases issuing from the reduction chamber can then be burned with more air to supply both the preheat necessary for the solid charge and the necessary preheat of the air used in the primary catalytic chamber.

On the other hand, if unconverted natural gas or a mixture of unconverted natural gas and a gas that has been partially converted in the reduction chamber with oxides of iron only and returned to the process for reuse, is used as the reducing agent it is necessary to add heat from external sources into the reduction chamber itself so as to maintain the temperatures necessary for reduction since the reaction is endothermic. In this cycle of reduction the gas issuing from the reduction chamber contains substantially no nitrogen and it has high calorific value. Any such issuing gas that is in excess of the amount recycled to the reduction chamber can be burned with air and used as a means of supplying the heat in the reduction chamber to supply the necessary heat for the endothermic reaction.

A method which develops efficient and economically operable means of providing continuous external heat in the reduction chamber itself and hence can use directly in the reduction chamber gases that have not previously been partially converted by the use of air in apparatus separate from the reduction chamber has certain considerable advantages. Also, in such a method there is considerable simplification of apparatus caused by elimination of the catalytic converter and direct use of natural gas as the reducing agent is possible. Moreover, although preheat of incoming charge and reducing gases is of course of economic benefit it is not essential to operation and does not have to be carried to the high temperatures and exact balance which are required for maintenance of continuous reduction when external heat is not applied within the reduction chamber itself.

My invention provides a method comprising a combination of steps and apparatus for carrying them out by which I can produce sponge iron in a fluidized bed economically and feasibly. I provide a way of preventing reduced metal particles from sticking together and losing their fluidity, and a method of introducing methane gas directly into the reduction chamber as a reducing agent as a component of the fluidizing gas, together with a method of introducing heat into the reduction chamber and keeping the fluidized mass at a sufficiently elevated temperature for the methane to act directly on iron oxide without the necessity of converting it to carbon monoxide and hydrogen outside of the reduction chamber. By the practice of the method in the apparatus provided by the invention I am able to produce sponge iron of high quality directly, economically, and with a low unit consumption of reducing gas in one continuously operating furnace unit.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which:

Fig. 4 is a partial view in section to larger scale of certain parts at the discharge end of the furnace;

Fig. 5 is a view in section showing a typical tuyere and connections;

Fig. 6 is a view in section showing a typical muffle and burner;

Fig. 7 is a view on line 7—7 of Fig. 6;

Fig. 8 is a view showing a seal in the roof of the furnace.

Figure 1:
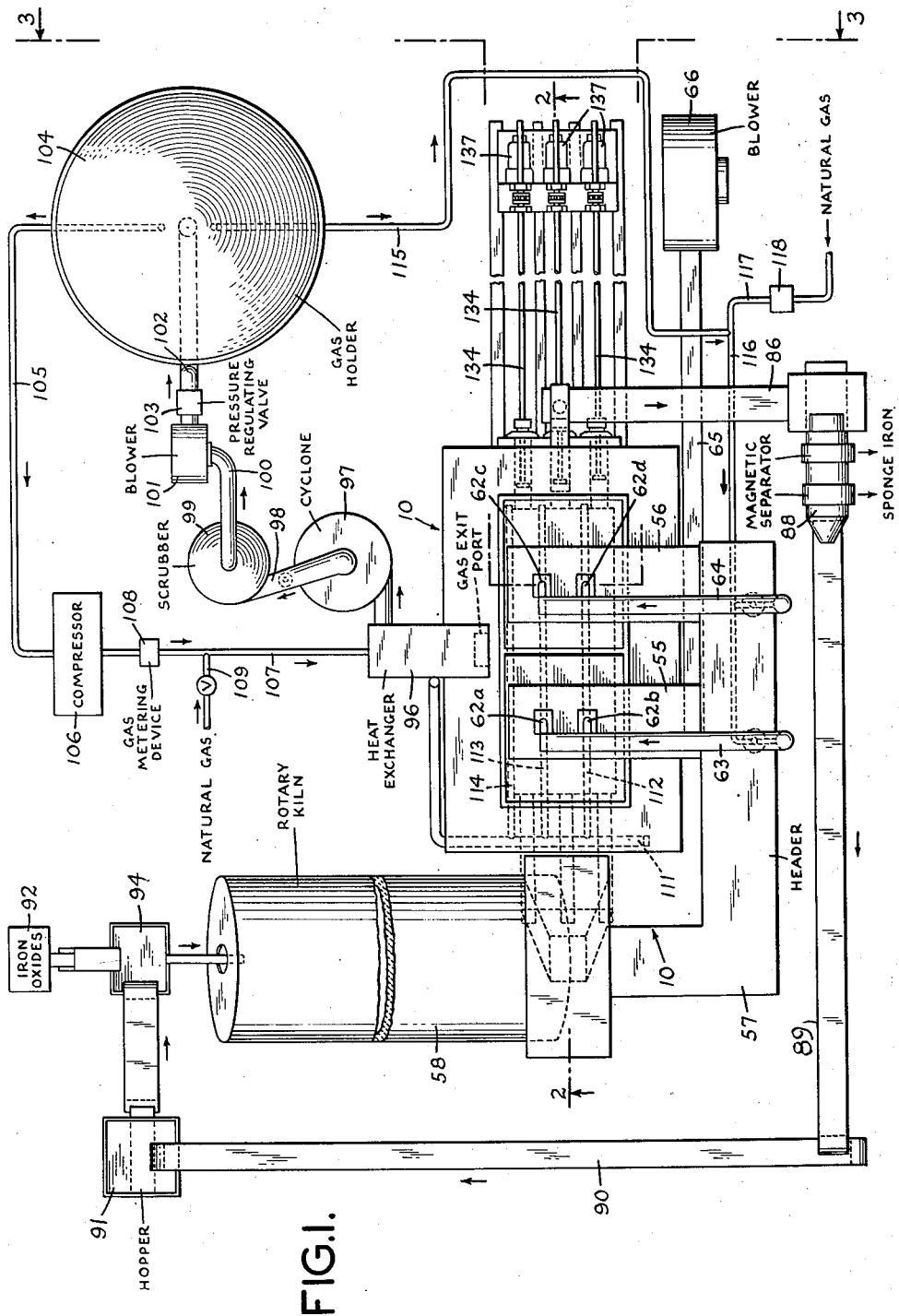
Fig. 1 is a plan view and largely diagrammatic to illustrate the process and apparatus embodying the invention.

Referring now to the drawings which illustrate a plant for carrying out the process and in which like reference characters indicate similar parts throughout the several views, the reduction furnace 10 is a unit of generally rectangular shape. It comprises an outer shell 11 of suitable metal, such as sheet steel and the furnace is equipped with buck stays (not shown) as may be required for construction purposes. The inner side walls 12 and end walls 13 are made of refractory brick 14, preferably with a slight outward arch. The outer side walls and end walls adjacent the steel shell 11 are made of insulating material 15 of suitable thickness. It will be noted that there is a space 16 between the inner walls and outer walls of the furnace, the space extending from the bottom plate 17 to a height corresponding to the height of the fluidized bed 18 of charge flowing through the furnace, as later described. The space 16 is filled with an unbonded, sized aggregate 19 of refractory material such as a mixture of silica pebbles, sand and dust. A preferred and satisfactory aggregate, suitable for making the furnace wall substantially gastight adjacent the fluidized bed 18 is described in further detail hereinafter. This space 16 should not be less than about six inches in width and, preferably, should be eight to ten inches in width. Its height should preferably be sufficient to extend as high as, or higher than, the height of the fluidized bed which flows through the furnace reducing chamber 20.

The bottom hearth 21 of the unit is made up of a layer of insulating material 22 covered by refractory material 23, these layers resting on bottom plate 17. The bottom plate 17 is perforated in parallel rows 24 (see Fig. 3) and mounted in the perforations 28 are tuyere connection couplings 25, comprising a pipe nipple 26 welded to the bottom plate 17 and having a flange 27 at its lower end (see Fig. 5). The holes 30 extend vertically through the bottom wall refractories for admission of tuyeres 31, as shown in Fig. 5. The tuyeres 31 are arranged in parallel rows 24 longitudinally of the furnace chamber 20 (see Figs. 2 and 3) between the inner side walls and end walls of the furnace and between the muffles 32, later to be described. One tuyere is located between the ends of the muffles 32 and also between the ends of the muffles and the end walls of the furnace. The tuyere apertures 28 in bed plate 17 should be spaced as closely together as is practical and preferably not farther apart than on six inch centers. I have found that a spacing on approximately four and one-half inch centers is satisfactory.

Figure 2:
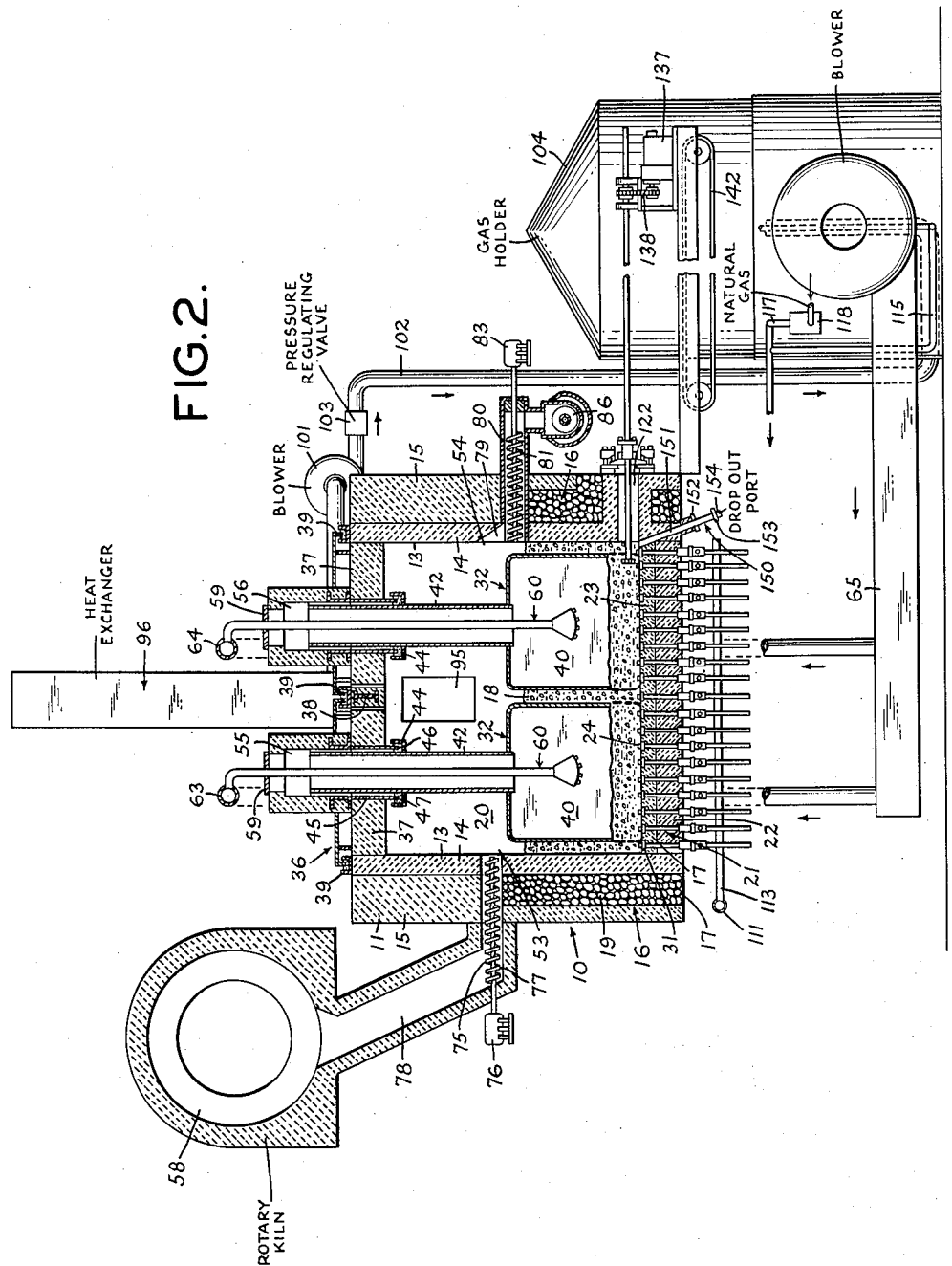
Fig. 2 is a view in elevation taken on line 2—2 of Fig. 1.
Figure 3:
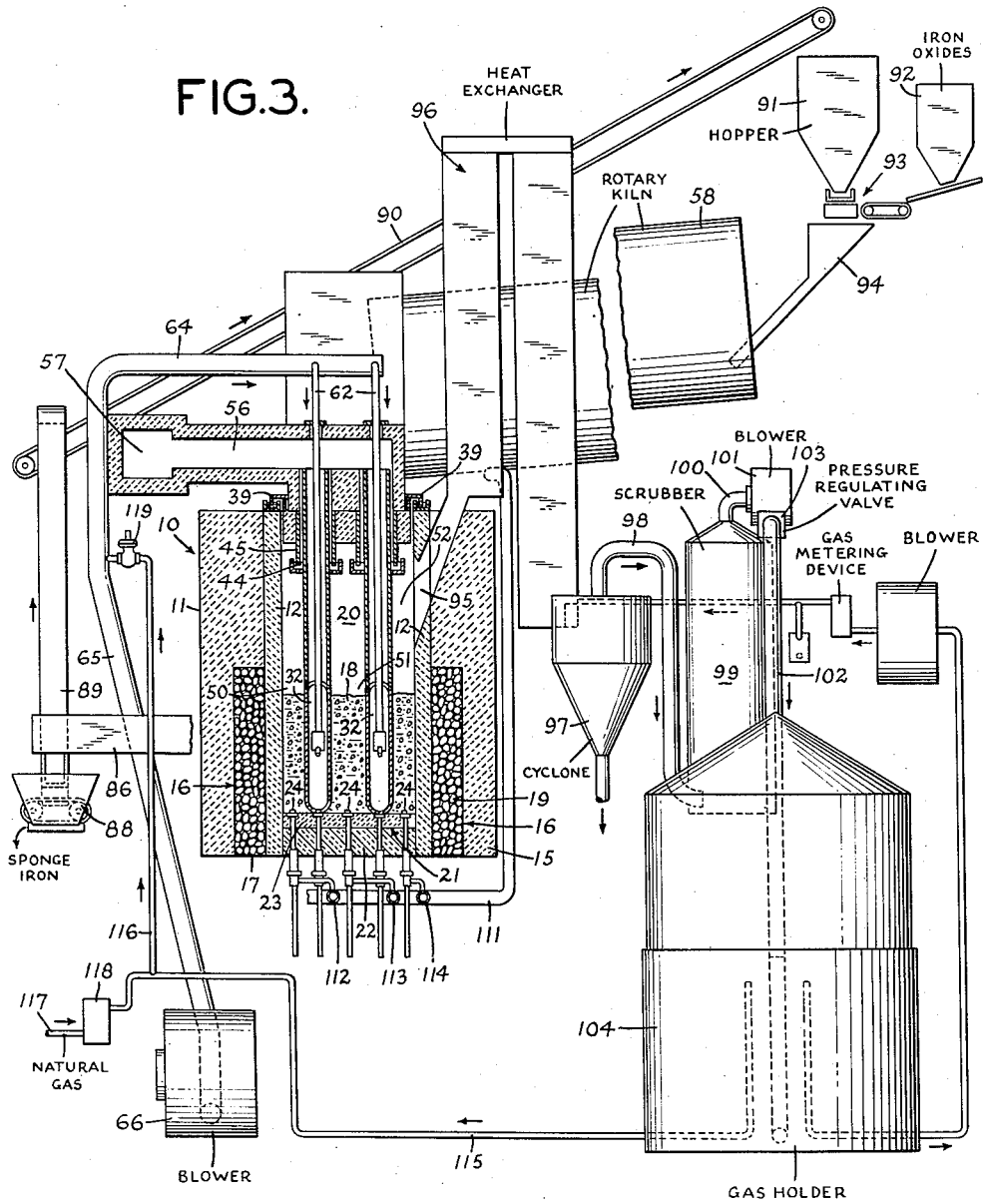
Fig. 3 is a view in elevation taken on line 3—3 of Fig. 1.

The furnace roof 36 is preferably made in removable sections and, as shown, comprises sections 37 supported on the side walls of the furnace and on transverse refractory covered beams 38 (see Fig. 2). Suitable gas sealing means are provided, and, as shown, they comprise sand seals 39, to prevent escape of furnace gases.

Heat muffles 32 are arranged in the furnace between the rows 24 of tuyeres 31. A typical muffle (see Figs. 6 and 7) comprises a rectangular shape muffle box 40 having an aperture in its top wall 41 to which is connected a pipe 42 secured to the muffle box and forming a stack. The stacks 42 protrude through the roof sections 37 (see Figs. 2 and 3). As shown the stacks 42 are rectangular in cross-section but may be oval or other suitable shape. The stacks are provided with a means to seal them to prevent escape of furnace gases. As shown, each stack is provided with a sand seal device which comprises a collar 43 welded to the pipe 42 providing an annular channel 44 in which is placed loose sand 47. A hollow pipe member 45 secured at its upper end to a roof section 37, depends from the roof section. This pipe member 45, as shown, is rectangular in cross-section so that its lower end 46 rests in the sand 47 in the annular box shaped channel 44. The bottom wall 50 of each muffle box 40 rests upon the bottom wall refractory 23 in the furnace chamber 20. It will now be observed that the muffles 32 are arranged in the furnace chamber 20 to form longitudinal channels 50, 51, 52 (see Fig. 3) through which the fluidized bed 18 of charge may flow from the charging end 53 of the furnace to the opposite or discharge end 54. The upper open ends of the stacks 42 are connected with cross-over flues 55 and 56, one for each transverse row of heat muffle stacks. These cross-over flues, in turn, connect with a main header flue 57 (see Figs. 1 and 2). The main header flue 57 connects with the discharge end of a rotary kiln 58, so that hot combustion gases from the muffles can be passed through the header flue 57 to preheat the charge of raw material fed into the rotary kiln 58 and thence to the reduction furnace chamber 20. Combustion gases leaving the kiln may be directed to a waste gas stack (not shown) for dissipation into the atmosphere.

Each muffle is provided with a gas burner 60 comprising specially designed burner box 61 and a connecting pipe 62 which extends through the top wall of the furnace through a plate 59 and thence downwardly into the muffle box 40. The burner pipes 62, a, b, c, d (see Fig. 1), connect with headers 63, 64, which in turn are connected to a main header pipe 65 connected to the discharge end of an air blower 66. It will be seen from the foregoing description that if it becomes necessary to replace a given heat muffle 32, the appropriate cross-over flue section 55 or 56 can be lifted and then the appropriate transverse roof section 37 can be lifted out, followed by lifting out the muffle itself.

The heat muffle boxes 40 may be made of welded plates or may be cast. The metal may be one capable of resisting oxidation by flame at temperatures of 1900° F. or higher. I have used muffles successfully that were made of welded sections of No. 310 stainless steel (24 Cr, 14 Ni) and also muffles that were cast of 38% nickel, 12% chromium material. Stacks, burners, and burner pipes may be of types 304 or 316 stainless steel or their equivalents in heat resistance. The muffle boxes should be substantially of the same height as the depth of the fluidized bed flowing through the furnace. Their length may vary over wide limits, especially if more than one burner and stack is provided for each muffle box, but for practical reasons of ease of construction, removal from the furnace, distribution of flame and such factors, I prefer to use a single stack muffle wherein the muffle box itself is approximately equal in length and height. The side walls 71 of the muffle may be flat, as illustrated in Figs. 6 and 7, and supported or reinforced by insulated cross pins 70. Or, they may be made slightly convex to provide greater resistance to warping when heated. The inside width of the muffle boxes 40 is governed by considerations discussed in further detail hereinafter. As shown they are 4 to 4½ inches, the latter being preferred. Walls one-half inch in thickness have been used and found adequate. As shown, the outside surfaces of the muffle boxes 40 which are in contact with the charge in the fluidized bed 18 are approximately twenty-one square feet per muffle and the internal volume in which the gases are burned is approximately three cubic feet, or a ratio of approximately seven square feet of heat conducting surface per cubic foot of combustion space or volume.

The burner 61 which is located in each of the muffle boxes is of generally sector shape as shown in Fig. 6 and the curved wall 73 of the burner is provided with a row of radially directed burner tips 74. A more detailed description of the burning of the gas in the muffles is set forth later herein.

The feed end 53 of the furnace is provided with one or more charging ports. As shown, a screw feeder 75 operated by a motor 76, forces charge through a charging tunnel 77 which connects with a feed hopper or chute 78 into which preheated charge is passed from the rotary kiln 58. As shown, the chute or hopper 78 receives the charge from the rotary kiln 58 but it will be understood that other means might be employed for preheating the charge and utilizing the hot muffle exit gases which pass into the header flue 57.

The discharge end 54 of the furnace, at the level of the desired height of fluidized bed 18, is provided with one or more discharge ports 79. As shown, a single discharge port or tunnel 79, is lined with a jacketed water-cooled pipe 80 (see Figs. 2 and 4) in which is mounted for rotation a screw conveyor 81 mounted on a hollow water-cooled shaft 82 which is rotated by motor 83 through chain drive 84. A rotary joint 85 of known construction provides means for supplying cooling fluid to the conveyor shaft 82. The discharge tunnel 79 connects with a suitable cooling device (see Figs. 1, 2, 3 and 4) for cooling the hot product discharged from the reducing furnace. As shown, a water-jacketed trough 86, provided with a water-cooled screw conveyer 87 mounted for rotation in the trough carries the discharged product to a magnetic separator 88. The magnetic separator separates magnetic product from the non-magnetic. In this instance, magnetic iron is collected as finished product and the inert diluent material (later described) is discharged to a belt conveyor 89 which carries it to an elevator belt conveyor 90 to a feed hopper or surge bin 91, from which it is fed in measured amount to the rotary kiln 58 together with new raw charge of iron oxide from feed hopper 92.

The furnace is provided with one or more bed gas exit ports. As shown, a port 95, in the side wall of the furnace near the top wall and above the level of the fluidized bed 18 in the furnace, is connected to a heat exchanger 96, serving as a gas-cooling device. The heat exchanger 96 is connected to a dust collector 97 such as a cyclone, so that gases flowing from the fluidized bed in the furnace are cooled, and dust removed. The dust collector 97 is connected by conduit 98 to a gas scrubber 99, wherein the bed gas is scrubbed and water vapor condensed and removed. The scrubber 99 is connected by conduit 100 to the intake side of a blower 101 which preferably is of the constant pressure turbine type. The discharge side of the blower is connected by conduit 102, through a pressure regulating valve arrangement 103, to a gas holder 104 of conventional type. Thus gas from the fluidized bed may be held at constant pressure in the furnace and is cleaned and dried and passed to the gas holder 104. In some instances the holder 104 may be dispensed with, in which case, pipe 102 may branch directly to pipes 105 and 115.

Gas pipe 105 leads from the gas holder 104 to the intake side of a compressor 106, and the discharge side is connected by a gas pipe 107 to the hot side of the heat exchanger 96. The gas line 107 is equipped with a metering device 108 to measure and regulate the amount of gas drawn from holder 104 and pumped to heat exchanger 96. Another pipe 109, having a valve 110 and connected to a source of natural gas under pressure, is connected to pipe 107 leading to heat exchanger 96. The opposite end of the heat exchanger is connected to a pipe 111, which in turn is connected to headers 112, 113, 114, each of which is connected to a row of tuyeres. It will now be seen that gas from the fluidized bed is passed through heat exchanger 96, cooled, cleaned and dried and returned to gas holder 104, from which the gas, or part of it, may be returned to the bed tuyeres and in the meantime new raw natural gas may be added to the stream of recycle gas going to the tuyeres and thence passing through the fluidized bed 18.

Another pipe 115 leads from the gas holder 104 and connects with a pipe 116, connected to a pipe 117 which is connected to a source of natural gas. This pipe has a metering device 118. Pipe 116, having a valve 119, connects with main header pipe 65 which is connected to air blower 66 as previously described. It will now be seen that gas may be drawn from holder 104 and passed into main header pipe 65 and mixed with air from blower 66 and then passed into the muffle burners and burned in the muffles 32. If desired, the bed gas passing through pipe 115 from holder 104 may be supplemented with additional raw natural gas if a gas of higher calorific value or more heat is required.

The furnace 10 may be provided with access ports at either or both ends. As shown, an access port 122 is provided in the discharge end 54 for each channel 24 or row of tuyeres. A typical arrangement is perhaps best shown in Fig. 4. It comprises a refractory lined tunnel 123 connecting with a registering aperture in the sheet metal shell 11. Above the row of tunnels 123 is a steel sheet or plate 124 which is welded to the furnace shell. At each side beyond the row of tunnels 123, the steel plate 124 is bent downwardly and welded to the bottom plate 17 of the furnace. Above the steel plate 124 the sized aggregate 19 is brought back all the way to the furnace shell 11 for a vertical distance of at least seven and one-half inches before the insulating brick is put in (see Fig. 4). The access ports are sealed with a suitable arrangement 125. As shown, a pair of channel irons 126 mounts a plate 127 having an aperture 128 to accommodate a punching or rabbling device 129. Brackets 130 secured to plate 127 by bolts 131 carry clamping bolts 132. A removable sealing plate 133 covers the aperture 128 and is clamped tight against plate 127. In the center of the sealing plate is a bore to accommodate a slidable rotatable water-cooled shaft 134. The sealing plate is provided with a packing gland 135, through which passes the internally water-cooled reciprocatable and rotatable shaft 134. A rotary joint 121 of known construction provides means for cooling water circulation. The shaft has a tooth-bladed tool 136 mounted on its inner end. This rabbling shaft 134 may be rotated or reciprocated by hand but preferably is arranged to be power operated.

As shown, the shaft is rotated by a gear in head motor 137 through chain drive 138. The motor and shaft are mounted on a bed plate 140 which in turn is mounted for forward and backward motion on suitable guideways or tracks 141. A link chain 142 is mounted on sprockets 143 and 144 on transverse rotatable shafts 145 and 146. The bed plate 140 is secured to a link of the chain by a depending hook member 147. Stops 148, 149 are provided to limit movement of the rabbling tool within the fluidized bed in channels 24. The bed plate 140 and hence the rotatable rabble shaft 134 may therefore be reciprocated by turning shaft 145 which may be done manually or by reversible motor (not shown) attached to it.

The furnace 10 is also provided with dropout ports 150 which may be located at one or both ends of the furnace or opposite one or more of the tuyere channels 24. These dropout ports, as shown, comprise an iron pipe 151 passing through the furnace bottom and having a flange 152 coupled to a flanged nipple 153. During operation of the furnace these dropout port pipes may be closed with a cap 154 and can readily be opened for draining out the bed of charge, in the event of shutting down the furnace.

The tuyere construction is shown perhaps best in Fig. 5 showing a typical tuyere. A nipple 26 made of two-inch pipe is secured at its upper end to tuyere hole 30 by welding the nipple to the furnace bottom plate 17. The lower end of nipple 26 has a pipe flange 27 secured to it. This flange 27 is removably bolted by bolts 159 to a registering flange 160 secured to the upper end of a nipple 161 closed at its lower end by a plate 162. Concentrically mounted in the center of the sealing nipples 26 and 161 is a one-half inch stainless steel tube 163 terminating at its upper end at the level of the furnace hearth surface. Secured to the upper end of the tube 163 is a pipe head 164, which is of stainless steel. At its upper annular surface it has a raised annular ridge 165. The lower end of tube 163 is secured to the upper run of a T 166, positioned in the nipple 161. The lower run of T 166 has secured to it a depending one-half inch stainless steel tube 167 extending through closure plate 162. Outside the sealing pipe 161 and secured to the lower end of tube 167 is another T 168, the lower run of which has secured thereto a packing gland connection 169.

Extending through the packing gland 169, T 168, tube 167, T 166 and tube 163 is a reciprocatable stainless steel rod 170. This steel rod terminates at its upper end in a tuyere head member 171, having an annular groove 172, complementary to ridge 165 in the upper surface of pipe head 164. The annular rim 173 of the tuyere head 171 has a plurality of circumferentially spaced slots 174. It will be seen that gas passing upwardly in the annular space 175, between the punch rod 170 and the tube 163 will pass over the ridge 165 then downwardly and then out of the slots 174 into the fluidized bed 18 in the channels 24 of the furnace.

Secured to the horizontal branch of T 166 is a nipple 176 extending through the cylindrical wall of nipple 161 and welded to it. This nipple 176 is connected to a pipe 177 by means of a union 178 in which is removably mounted an orifice plate 179. Pipe 177 connects with an elbow 180 and nipple 181 to a tuyere header, such as header 112. The horizontal branch of T 168 is connected to a pipe 182, in turn connected to a quick-acting valve 183, which is connected to a source (not shown) of natural gas under suitable pressure. It will be seen from the foregoing description that the tuyere is designed for punching. If desired to punch the fluidized bed or to loosen the tuyere head if it becomes clogged, this may be done by raising the punch bar 170 which can be made slidable in the packing gland 169. This will raise head 171. Meantime supplementary natural gas may be introduced, if desired, through quick-acting valve 183.

The plant may be operated for the production of sponge iron from iron oxide as follows.

The temperature of the hearth proper is first brought up to approximately the desired temperature of 1650° F. by burning natural gas passed through pipe 117, through pipe 116, through header 65 into headers 63, 64 and into pipes 62 and burned in the muffles 32; air being supplied by air blower 66.

Feed consisting of comminuted iron oxide material such as sulfur-free calcines from the roasting of pyrite or crushed hematite or magnetic iron ores, is fed from hopper 92 and is passed into charging chute 94 together with an inert material from hopper 91; the relative amount of inert material being regulated by a weighing device 93. Although comminuted inert material such as silica, alumina, magnesia, may be used, I prefer to use burned lime (CaO) as this material is cheap and readily available and as it appears to permit active reduction of the charge at a lower bed temperature and with less tendency to unwanted fusion and agglomeration of the particles of iron formed in the fluidized bed than do other materials.

The mixture of iron oxide material and burned lime is passed through preheating kiln 58, where it is preheated by hot gasses from the muffles 32 through crossover flues 55 and 56 and main header flue 57. The preheated charge is then fed into hopper 78 and thence by screw conveyor 77 through charging port 75 into the furnace proper. The charge distributes itself in the tuyere channels 24 provided by the side walls of the furnace and the side walls of the muffle boxes 40. The charge is fluidized by the reducing gases passing upwardly through the tuyeres 31, which as previously described, are arranged in rows in the bottom wall of the furnace. The gas used for the reduction of the iron oxide and for the fluidization, as described in detail later, comprises natural gas and preferably a mixture of natural gas and a certain amount of recycle gas. The gas entering through the tuyeres reduces the iron oxide in the fluidized bed to iron and the natural gas is reformed and the gas leaving the top surface of the fluidized bed contains $CO$, $CO_2$, $H_2O$, some $H_2$ and some unreacted methane. The gases leaving the bed, herein referred to as "bed gases," are taken out of the furnace in a continuous stream via the exit port 95 by the action of gas blower 101, after passing through heat exchanger 96, dust collector cyclone 97, and scrubber 99, and are delivered to gas holder 104. Part of this gas is drawn from holder 104 by compressor 106 and together with natural gas, is passed through heat exchanger 96, where the gases are preheated and then passed into tuyere header 111 and thence through manifolds 112, 113, 114 through the tuyeres 31 into the charge 18 for fluidizing the bed and reducing the iron oxide, as the charge flows as a continuous stream (similar to a slowly boiling liquid) through the furnace. In the event that it is desired to eliminate the holder 104, the gas from pipe 102 may be distributed directly to pipes 105 and 115.

The reduced product flows into discharge port 79 and is carried by screw conveyor 81 to the cooler trough 86 and thence to magnetic separator 88. The reduced iron product is there separated from the inert burned lime (CaO). The inert material is then carried by conveyors 89 and 90 to the feed hopper or surge bin 91 to be recycled with new charge of raw iron oxide material fed from hopper 92.

Such part of the bed gases carried to holder 104, which is not required for return to the tuyeres, is conducted through pipe 115 and mixing connection 119 to be mixed with air from blower 66 and burned in the muffles 32 through burners 60. If more heat is required in the muffles than can be supplied from the bed gases, then additional natural gas may be passed through pipe 118 to mixer 119 to be mixed with the bed gas and burned in the muffles with the air from blower 66.

It may be pointed out here that the heat required for the endothermic reduction reaction of iron oxide to iron is not wholly supplied by preheating the reducing gas but it is significant to note that the bed gases which contain calorific value are burned in the muffles, together with natural gas, if necessary or desired, so that heat is supplied by radiation from and conduction through the heat conducting walls of the muffles to the fluidized charge passing through the furnace.

One of the difficulties in reducing iron oxides to metal form in a fluidized bed is due to the fact that as reduction proceeds, particles of iron tend to stick together and form spongy masses or agglomerates which will not fluidize. I am able by my method to prevent this sticking and agglomeration which includes a number, or series, of steps which when practiced together produce the desired ends.

First, the iron oxide material should be properly sized before entering the process so that there is no excessive difference between the coarsest particle sizes and the finest. For example, in fluidizing and reducing pyritic material which has been calcined and sintered according to practice well known in the art I prefer to crush the resulting sinter cake to a size of approximately —20+150 mesh before using it in the process. If the material consists of a very dense iron oxide such as is found in certain magnetic iron ores, I may find it advisable to crush this material even finer, to say perhaps —65+150 mesh size.

The next step in making possible freedom from agglomeration consists in mixing with the iron oxide feed a refractory inert diluent crushed to a particle size approximating that of the iron oxide itself. Such an inert diluent may consist of any of the more active metal oxides such as silica, alumina, magnesia, lime, etc. which are not reduced by reducing gases under the temperature conditions at which iron oxide is reduced and which are sufficiently refractory not to fuse with the iron oxide. The proportion which I prefer to use of refractory inert material, preferably burned lime (CaO), to iron oxide is approximately two parts of inert material by weight to one part iron oxide, although I have found that I can use as low as one part refractory material to one part iron oxide, and of course the upper limits are determined only by practical considerations of heat economy.

Another step or precaution for prevention of agglomeration of the particles consists in the maintenance of sufficient gas velocity spread uniformly throughout the whole fluidized bed. The actual velocity required for fluidization will vary with the depth of the bed, the size of the particles, the temperature at which the bed is maintained, and the specific gravity of the gas. If the gases fed to the bed are of a density equal to 55% to 60% of that of air, the temperature of the bed at a preferred level of 1650 to 1680° F., and the preferred depth of bed approximately 36 inches, I have found, when using feed crushed to −20 mesh+150 mesh, that a flow of fluidizing gases leaving the bed equal to ½ cu. ft./sec./sq. ft. of bed measured at standard conditions is sufficient to give good fluidization. In cases where the material is more finely ground it may be desirable to drop this flow to as little as .2 cu. ft./sec./sq. ft. of bed. In cases where the gas contains such a high proportion of hydrogen that its gravity has dropped to substantially less than half that of air it may be found necessary to increase the gas flow to values in the neighborhood of 1 to 1½ cu. ft./sec./sq. ft.

I have found that not only should the total gas flow be kept within the limits described above but that the gas flow should be maintained very uniformly throughout the whole area of the fluidized bed. One way of maintaining such uniformity is by the use of a restricted orifice (such as orifice 179, Fig. 5) in each of the tuyeres so that the gas passing from a manifold (such as 112) through the tuyere into the bed 18 will have a pressure drop through this orifice that is equal to or greater than the hydrostatic pressure of the bed into which the fluidizing gas is being fed. The hydrostatic pressure of the fluidized bed will of course depend upon the depth of the bed and the gravity of the material being reduced and of its inert diluent and the degree of agitation, but will generally be approximately 1½ to 2 lbs./sq. in.

I prefer to maintain the pressure of the gas above the fluidized bed 18 slightly above atmospheric (say at least 0.1 inch of water) in order to prevent leakage of air into the furnace. Because the pressure of the gas at the bottom of the bed is of the magnitude described and the pressure of the gas leaving the bed is slightly above that of the atmosphere, I have found it very important to provide side walls for the furnace which are gas-tight and will not permit gas under pressure to escape through the brick to areas near the outside shell of the furnace where they can rise and by-pass the bed itself. I accomplish this by introducing just inside the inner layer of brickwork 14 forming the inside wall of the furnace, a wall 19 which consists of an unbonded sized aggregate of refractory material which may be quartz rock or any other suitable refractory. This material is sized so as to give it maximum specific gravity. This is accomplished by filling the interstices between relatively large particles with size particles considerably smaller. In turn the interstices between the small particles are filled with a yet smaller size and again the interstices between these small particles are filled with a very fine powder of the same refractory material. For example, one preferred mix which I have found very satisfactory consists of 59.5 parts by weight of minus 2 inches plus one inch silica (quartz) pebbles, 22 parts by weight of minus 6 mesh plus 20 mesh silica sand, and 13.2 parts by weight of minus 50 plus 140 mesh silica sand, and 5.3 parts by weight of minus 200 mesh silica dust. I have found that if properly and intimately mixed this material will have a gravity close to 90% of that of pure quartz and is substantially gas-tight at pressures under which the furnace is operated. Moreover, as the material is free flowing, no cracks or openings are developed due to expansion or contraction caused by changes in furnace temperature so that the walls when this type of aggregate is used remain substantially gas-tight.

In the foregoing, I have described a combination of steps for preventing agglomeration of particles of iron in the fluidized bed which include use of relatively uniform sizing of the feed to the furnace, use of an inert diluent mixed with the iron oxide feed, use of a rate of flow of gas so distributed as to keep the whole bed in fluid suspension, and use of a means of sealing the side walls of the furnace which will cause substantially all gas passing through the tuyeres to ascend through the bed.

In Fig. 5 there is shown details of a tuyere mechanism in which the tuyere head can be pushed upward, blown with extra gas, rotated and pulled down again to its original position. In Fig. 4 I have shown details of a rabbling mechanism in which a rotating blade can be pushed the length of the fluidized beds in the channels between the heat muffles and returned. Neither the "punchable" tuyere nor the rabbling mechanism is essential to this process provided all the conditions specified above are continuously met. However, minor difficulties and variations in operation may cause temporary spots in the furnace where segregation and sticking together of iron particles occurs. If such aggregates fall back into the beds they tend to gather as lumps along the bottom of the channels, and interfere with uniform distribution of the gas upwards through the bed. I have found that both the "punchable" tuyeres and the rabbling mechanism constitute very effective means of breaking up and refluidizing any such lumps as may have gathered in the beds, without having to drain the furnace through dropout ports 150 and without having to open up access ports 122. Nevertheless, I have found it desirable and very useful to provide the furnace with the dropout ports 150 and the access ports 122.

I have found that raw natural gas by itself is an extremely active reducing agent in cases where the bed temperature is maintained above 1600° F., and preferably above 1650°. However, because the natural gas must act both as a fluidizing agent and as a reducing agent it is necessary to pass the gas through the tuyeres at a rate sufficient to keep the bed fluid.

Since the reduction of iron with natural gas requires heat, only as much iron oxide can be reduced as corresponds to the heat that can be transferred through the muffles. If the volume of natural gas passed through the beds to maintain their fluidity causes a rate of reduction of iron calling for more heat than the rate of heat transfer through the muffle walls can supply, then the temperature of the beds will fall and the rate of reduction will decrease. The natural gas tends to crack into its components of free carbon and hydrogen gas at temperatures above the neighborhood of 1350° F.–1400° F., whereas the reaction with the oxygen in FeO is not very active below about 1600° F. and if the bed temperature falls some cracking will occur and free carbon or "soot" will be liberated in the beds.

Moreover, although raw natural gas reacts very strongly with iron oxides even when a considerable percentage of the iron has been reduced to metal, at a certain point, generally when 60–80% of the iron has been reduced, the "activity factor" of the iron oxide remaining, suddenly drops, i. e., there is not enough oxide remaining in contact with the flow of gas to fully react with or "convert" it and the gas cracks into free carbon plus hydrogen gas. At this point the specific gravity of the gas suddenly declines due to the increase of hydrogen and decrease of CO and CO content, the fluidity of the bed decreases, and the bed will tend to "set up" badly.

I have found that the major difficulties can be avoided by recycling along with new natural gas, bed gas that has been taken off the top of the fluidized bed and which has been cooled to remove water vapor. The "recycle" gas contains $CO_2$, CO, free hydrogen, and unreacted methane. I have found that the presence of this bed gas in admixture with raw natural gas eliminates the cracking of natural gas if the proportions are controlled so that the gas coming out of the fluidized bed contains at least 2½ to 4% $CO_2$ by dry volume and preferably 4 to 8% $CO_2$ by dry volume. The proportion of the two gases, i. e., recycle gas and new natural gas, going into the bed to produce a gas of given composition coming out of the fluidized bed will vary with the width of the bed, its temperature and the rate of heat transfer through the muffle walls and the degree of reduction of iron oxide to metal in the beds. Other conditions being equal, I have found that as the ratio of gas recycled to new natural gas added is increased, the $CO_2$ and CO in the bed exit gas increases and the free hydrogen and unreacted methane decreases. The upper limit of ratio of recycle gas to new natural gas fed into the bed is reached when the expansion of volume caused by conversion of methane in contact with the oxygen content of the iron oxides in the bed is no greater than the volume of water vapor formed in the passage of gases through the bed and removed in the cooling system. As this point is approached the conversion efficiency of the methane (i. e., its conversion into $CO_2$, CO, $H_2O$ and $H_2$) becomes very high and in the practice of my invention I have reduced iron oxide to iron with as little as 5 or 6 cubic feet of new natural gas per pound of iron reduced. However, in operating in this manner there may be substantially no excess bed exit gases available for supplying heat to the muffles. Conversely, if the ratio of recycle gas to new natural gas is reduced more exit gas may be produced than is required both for recycling to the beds and for supplying all of the gas required for combustion in the heat muffles. I prefer to mix new natural gas with recycle gas in such proportions that there will be produced just enough excess bed exit gas to furnish all the heat liberated by combustion in the heat muffles. The exact amounts of natural gas required per pound of iron reduced and of proportion of recycle gas to new natural gas used will vary over quite wide limits in response to all the different factors that contribute to satisfactory operation. As a practical matter I have found that the introduction through the tuyeres in the illustrated furnace of between 9 and 13 cubic feet of new natural gas per pound of iron to be reduced to metal and a ratio of recycle gas to new natural gas in the mixture going to the tuyeres of from 3 to 1 to about 9 to 1 generally will be sufficient.

It will be seen from the foregoing that my method of introducing heat into the fluidized bed to maintain temperature during reduction consists in introducing substantially rectangular shaped boxes or muffles into the reducing chamber, preferably in parallel rows as in the furnace illustrated in the drawings and preferably the muffles are constructed as described, so that a premixed mixture of air and gas (new natural gas or excess bed gas) is fed through a pipe, which extends through the gas exit stack to the burner located at about the center of the heat muffle as illustrated in Figs. 2, 3, 6 and 7. In this construction the products of combustion leave the muffle box and pass up through the stack and then may be used to preheat the charge. And the heat required for the endothermic reducing reaction to proceed in the bed of iron oxide passes through the muffle walls so that the products of the combustion do not contact the fluidized bed.

When the burner 61 is placed as illustrated in Fig. 6, a jet stream of unburnt gases issuing from the burner ports or tips 74 flows directly against a returning stream of product gases which are continually losing heat through the muffle walls. This produces an intimate mixture and a turbulent condition which moderates the flame. During the period of initial warming up of the furnace at the start of operations, the flow of gases to the muffles is kept very low and a visible cone of flame can be seen at or just beyond the burner tips and a corresponding area of local high heating of the muffle walls is visible. I have found that when a flow per cubic foot of combustion space of approximately 1400 cu. ft. per hour of unburnt gas is reached and a jet velocity (measured at standard conditions) through the burner ports 74 greater than approximately 140 ft. per sec. is reached, the intimate mixture of gases and the turbulence created becomes so great that a quite sudden transformation takes place. All visible focus of flame disappears and the whole exterior of the muffle appears to glow with a uniformly distributed mixture of hot reacting gases. Also, local hot spots on the muffle wall surfaces completely disappear. In order to maintain constantly the optimum degree of intimate gas mixture and turbulence I prefer to fix the flow of air into the burners at a constant predetermined level preferably between 2000 and 2500 cu. ft. of air per hour per cubic foot of combustion space and vary the total heat input to the muffles by varying the proportion of gas added to the air stream. The greater the ratio of surface area of the muffle to its internal volume the greater is the total heat that can be removed through the muffle walls and the greater is the proportion of gas to air that can be used in the ingoing air gas mixture. Where, as in the preferred muffle construction shown in Fig. 6, the ratio of surface area to internal volume is approximately 7 to 1, I find that when introducing approximately 2500 cu. ft, of air per hour per cubic foot of combustion space, enough gas may be added to the air stream to utilize up to about 69% of the oxygen in the air (45% excess air). At this rate the muffle walls will approach approximately 1900° F. when the fluidized bed is held at 1650° to 1670° F. and the rate of heat transfer may approximate 12,000 B. t. u. per sq. ft. per hour of muffle external surface. Generally, I prefer in order to put less strain on the muffle walls to operate at a slightly lower gas input corresponding to 50 to 55% excess air with a correspondingly somewhat lower muffle wall temperature and heat transfer rate.

As an example of the operation of my process in a unit built in the manner illustrated in the drawings but containing only two heat muffles instead of four, I have in one period concluded a series of nine test runs totalling 837 hours of operation. One of the tests was continued for 12 days. During this test period the unit produced 83,000 lbs. of magnetic product containing approximately 90% iron of which approximately 79% was reduced to metal. The feed in all cases consisted of crushed sintered material which had been produced by the roasting and sintering of pyrite. The sinter contained 68.3% iron of which approximately 57.5% was present as hematite and approximately 42.5% was present as magnetite. Throughout these tests the product was in all cases screened to minus 20 plus 150 mesh and mixed with two parts by weight of burnt lime (CaO) per unit weight of sinter fed to the preheating kiln. During one period of 165 hours of very uniform operation of this unit the gases exiting from the fluidized bed averaged in volume 7300 cu. ft. (measured at standard conditions) per hour with an analysis as follows:

|     | $CO_2$ | CO | $H_2O$ | $H_2$ | $CH_4$ | $N_2$ |
|-----|--------|-------|--------|-------|--------|-------|
| Dry | 6.21 | 28.0 | | 29.55 | 27.38 | 8.69 |
| Wet | 5.75 | 26.11 | 7.33 | 27.38 | 25.37 | 8.06 |

After passing through the gas scrubber the gases available for recycling and for combustion heat muffles had the following analysis:

|     | $CO_2$ | CO | $H_2O$ | $H_2$ | $CH_4$ | $N_2$ |
|-----|--------|-------|--------|-------|--------|-------|
| To Recycle | 6.03 | 27.34 | 2.94 | 28.68 | 26.58 | 8.43 |

The average volume of gas introduced to the fluidized bed through the tuyeres was 6,485 cu. ft. per hour, of which 5,876 was recycle gas of the above composition and 609 cu. ft. was new natural gas containing 93.7% methane. During this particular period of operation the solid materials entering the furnace through feeder screws at the charging end of the furnace was preheated to an average temperature of 750° F.

An average of 140 lbs. of sinter feed crushed to minus 20 plus 150 mesh plus 280 lbs. per hour of burnt lime was fed into the preheating kiln and there was discharged from the furnace 95.65 lbs. per hour of total iron of which 79.09% equal to 75.65 lb. per hour was reduced to iron metal, the balance being present as ferrous oxide. The magnetic product discharge from the magnetic separator averaged 90.46% iron.

During this period an average of 14,756 cu. ft. of air per hour was passed to the heat muffles along with 985 cu. ft. per hour of natural gas. The average percent $CO_2$ in the muffle exit gases was 7.72% equivalent to the use of 49% excess air. The air was fed to the muffles by a blower which raised its temperature entering the muffle burner pipes to 140° F. The average maximum temperature of muffle walls was 1860° F. as recorded by optical pyrometer. The average temperature of muffle exit gases when entering the muffle stacks was 1780° F. and at the top of the stacks it was 1650° F. as a result of the cooling action of the entering gases in the burner pipes. The average temperature of the fluidized bed was 1660° F.

Thermal balance of this combustion indicates a heat input to the muffles of 460,523 B. t. u. per hour which is equal to approximately 11,000 B. t. u. per hour per sq. ft. muffle surface. Of this total heat, 348,850 B. t. u. per hour was required to bring the solids and gases up to bed temperature and to carry out the reduction of the iron, the balance of 111,670 B. t. u. being heat lost by radiation through the walls of the furnace unit, which in this instance had a total surface area of the fluidized bed of approximately 4 sq. ft., or 2 sq. ft. of bed per muffle unit. The ratio of recycle gas to new natural gas fed to the fluidized bed was 9.65 to 1.

The run described above used only natural gas in the muffles. This was done in order to obtain the most accurate possible heat balance for the operation. In other runs in which over ten tons of iron metal was produced the fuel used in the muffles was composed principally of excess bed exit gas plus small proportions of additional new natural gas.

In another particular series of tests made to study variations in the ratio of recycle gas to natural gas the following results were obtained:

| Ratio Recycle Gas to New Natural Gas | Percent $CO_2$ dry basis in Exit Gases | Percent of Iron Reduced to Metal | Lbs. of Iron Metal per Hour | Cu. Ft. Natural Gas per Lb. Iron Metal |
|---|---|---|---|---|
| 13.0 | 9.09 | 70.65 | 52.1 | 8.9 |
| 10.2 | 8.10 | 72.93 | 61.8 | 9.4 |
| 7.4 | 6.47 | 83.48 | 68.82 | 11.2 |

The correspondence between ratio of recycle gas to new natural gas and the other factors listed in the table is self-evident. The excess air in the gas mixture to the muffles in this series of tests was 58% instead of the 49% in the 162 hour test described above. This accounts for the reduced hourly rate of iron metal production.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for producing sponge iron from a comminuted charge containing iron oxide which comprises a furnace having walls defining a reducing chamber, replaceable muffles positioned in said chamber providing longitudinal fluidized bed channels through which a fluidized bed of charge containing the iron oxide is passed as a continuous stream, tuyeres located in the bottoms of said channels through which reducing gas is passed to fluidize said bed and to reduce iron oxide to iron as the charge passes through said channels, burner means in said muffles for burning combustible gas in said muffles to supply heat in said muffles which passes through said muffle walls to furnish heat for the endothermic reducing reaction in the fluidized bed of charge, and conduit means to carry the combustion gases from said muffles without said combustion gases coming in contact with said fluidized bed of charge.

2. Apparatus for producing sponge iron from a comminuted charge containing iron oxide which comprises a preheater for preheating said charge, a furnace having walls defining a reducing chamber, means to carry preheated charge from said preheater to said furnace, replaceable muffles positioned in said chamber, said muffles comprising muffle boxes having substantially flat side walls providing longitudinal fluidized bed channels through which a fluidized bed of charge containing the iron oxide is passed as a continuous stream and stacks extending upwardly from said muffle boxes, tuyeres located in the bottoms of said channels through which reducing gas is passed to fluidize said bed and to reduce iron oxide to iron as the charge passes through said channels, conduit means to recycle bed gases from said fluidized bed through said tuyeres and fluidized bed, burner means in said muffles for burning combustible bed gases in said muffles to supply heat in said muffles which passes through said muffle walls to furnish heat for the endothermic reducing reaction in the fluidized bed of charge, and conduit means connected to said stacks to carry the hot combustion gases from said muffles without said combustion gases coming in contact with said fluidized bed of charge.

3. Apparatus for producing sponge iron from a comminuted charge containing iron oxide which comprises means for perheating said charge, a furnace having walls defining a reducing chamber, replaceable muffles positioned in said chamber, said muffles comprising muffle boxes having generally rectangular shaped side walls providing longitudinal fluidized bed channels through which a fluidized bed of charge containing the iron oxide is passed as a continuous stream, and stacks extending upwardly from said boxes, tuyeres located in the bottoms of said channels through which reducing gas is passed to fluidize said bed and to reduce iron oxide to iron as the charge passes through said channels, burner means including a conduit through each of said stacks and a gas burner in each muffle box, for burning combustible gas in said muffles to supply heat in said muffle which passes through said muffle box walls to furnish heat for the endothermic reducing reaction in the fluidized bed of charge, and conduit means connected to said stacks to carry the combustion gases from said muffles to said preheating means without said combustion gases coming in contact with said fluidized bed of charge.

4. Apparatus for producing sponge iron from a comminuted charge containing iron oxide which comprises a furnace having walls defining a reducing chamber, replaceable muffles positioned in said chamber providing longitudinal fluidized bed channels through which a fluidized bed of charge containing the iron oxide is passed as a continuous stream, tuyeres located in the bottoms of said channels through which reducing gas is passed to fluidize said bed and to reduce iron oxide to iron as the charge passes through said channels, burner means in said muffles for burning combustible gas in said muffles to supply heat in said muffles which passes through said muffle walls to furnish heat for the endothermic reducing reaction in the fluidized bed of charge, and conduit means to carry the combustion gases from said muffles without said combustion gases coming in contact with said fluidized bed of charge, said tuyeres comprising a hollow vertical heat-resistant metal tube terminating at its upper end in an annular rim head having a flat annular surface from which upwardly extends an annular ridge, a heat-resistant metal rod mounted for vertical reciprocal motion within said hollow tube and terminating at its upper end in an annular head member having an annular groove complementary to said annular ridge and having slots providing passages for gas from said hollow tube to said fluidized bed, and a gas connection for introducing gas to said hollow tube.

5. Apparatus for producing sponge iron from a comminuted charge containing iron oxide which comprises a furnace having walls defining a reducing chamber, said walls including an inside layer of refractory and an outside insulated layer spaced from said inside layer to provide an interior space of substantial thickness therebetween, and an aggregate of heat-resistant refractory filling said interior space, said aggregate comprising unbonded sized particles which render said walls substantially gas-tight, replaceable muffles positioned in said chamber providing longitudinal fluidized bed channels through which a fluidized bed of charge containing the iron oxide is passed as a continuous stream, tuyeres located in the bottoms of said channels through which reducing gas is passed to fluidized said bed and to reduce iron oxide to iron as the charge passes through said channels, burner means in said muffles for burning combustible gas in said muffles to supply heat in said muffles which passes through said muffle walls to furnish heat for the endothermic reducing reaction in the fluidized bed of charge, and conduit means to carry the combustion gases from said muffles without said combustion gases coming in contact with said fluidized bed of charge.

6. Apparatus for producing sponge iron from a comminuted charge containing iron oxide and an inert refractory material which comprises a furnace having walls defining a reducing chamber, replaceable muffles positioned in said reducing chamber, said muffles including muffle boxes having side walls providing fluidized bed channels through which a fluidized bed of the charge is passed as a continuous stream and having exit stacks connected to said boxes for carrying combustion gases from said boxes away from said boxes without contact with the charge in said fluidized bed, tuyeres in the bottoms of said channels for introducing reducing gas into said charge and for fluidizing said bed, rabbling means reciprocatable through the charge in said channels and operable from outside said reducing chamber, gas burners in said muffle boxes for burning combustible gas in said boxes to supply heat which passes through the walls of said muffle boxes to furnish heat necessary for the endothermic reducing action of reducing iron oxide in said charge to sponge iron and means for separating sponge iron from said inert material after the charge passes through said reducing chamber.

7. A system for producing sponge iron from a comminuted charge containing iron oxide and an inert comminuted refractory material which comprises a charge preheating chamber through which the charge is passed, said preheater having a charging end, a furnace having walls defining a reducing chamber, means to deliver preheated charge from said preheating chamber to said reducing chamber, a plurality of replaceable muffles positioned in said reducing chamber providing parallel channels through which said charge passes in a continuous stream as a fluidized bed, a row of tuyeres in the bottoms of each of said channels, conduit means for supplying reducing gas containing a substantial proportion of methane to said charge through said tuyeres into said channels to fluidize the bed and to reduce iron oxide in said charge to iron, conduit means leading from said reducing chamber from above said fluidized bed to remove reformed bed gases, means for cleaning said bed gases and for recycling the cleaned gases through said tuyeres through said fluidized bed together with said methane-containing gas, gas burners within said muffles, conduit means to deliver bed gases withdrawn from said reducing chamber to said burners, conduit means to carry combustion gases from said muffles without contact with said charge in said fluidized bed and deliver said hot combustion gases to said preheating chamber for preheating said charge, means for separating the reduced iron in said charge as sponge iron from said inert refractory material after the charge has been discharged from said reducing chamber, means to deliver said discharged charge to said separating means, and conveyor mechanism to return said inert material separated from the sponge iron to the charging end of said preheating chamber for recycling with new iron oxide charge.

8. A system for producing sponge iron from a comminuted charge containing iron oxide and comminuted burnt lime, which comprises a preheater through which the charge is passed, said preheater having a charging end, a furnace having walls defining a reducing chamber, said walls having an interior space filled with unbonded sized silica aggregate to render said walls gas-tight, means for delivering preheated charge from said preheater to said reducing chamber, a plurality of replaceable muffles of heat resistant metal positioned in said reducing chamber providing parallel channels through which said charge passes in a continuous stream as a fluidized bed, a row of punchable tuyeres in the bottoms of each of said channels, conduit means supplying natural gas containing a substantial proportion of methane to said charge through said tuyeres into said channels to fluidize the bed and to reduce iron oxide in said charge to iron, conduit means leading from said reducing chamber from above said fluidized bed to remove reformed bed gases from said reducing chamber, means for cleaning, cooling and drying said bed gases and for recycling the cleaned gases through said tuyeres through said fluidized bed together with said natural gas, gas burners within said muffles, conduit means delivering bed gases withdrawn from said reducing chamber to said burners, conduit means carrying combustion gases from said muffles without contact with said charge in said fluidized bed and delivering said hot combustion gases to said preheating chamber for preheating said charge, a magnetic separator separating the reduced iron in said charge from said burnt lime after the charge has been discharged from said reducing chamber, means delivering said discharged charge to said magnetic separator, and conveyor mechanism returning said burnt lime to the charging end of said preheating chamber for recycling with new iron oxide charge.

9. Apparatus for producing sponge iron from a comminuted charge containing iron oxide which comprises a furnace having walls defining a reducing chamber, replaceable muffles positioned in said chamber providing longitudinal fluidized bed channels through which a fluidized bed of charge containing the iron oxide is passed as a continuous stream, tuyeres located in the bottoms of said channels through which reducing gas is passed to fluidize said bed and to reduce iron oxide to iron as the charge passes through said channels, burner means in said muffles for burning combustible gas in said muffles to supply heat in said muffles which passes through said muffle walls to furnish heat for the endothermic reducing reaction in the fluidized bed of charge, and conduit means to carry the combustion gases from said muffles without said combustion gases coming in contact with said fluidized bed of charge, said muffles comprising a muffle box having walls presenting a surface area having a ratio to internal volume of about 7 to 1, and said conduit means comprising a stack extending upwardly from said box and said burner means comprising a gas carrying pipe extending downwardly through said stack and terminating in a burner having tips to insure a jet velocity sufficient to cause turbulent flow of combustion gases through said box to cause said muffle walls to be heated to an incandescent glow.

10. Apparatus for producing sponge iron from a comminuted charge containing iron oxide which comprises a furnace having walls defining a reducing chamber, a plurality of replaceable muffles in said chamber arranged to provide longitudinal fluidized bed channels through which a fluidized bed of charge containing the iron oxide is passed as a continuous stream, tuyeres located in said channels through which reducing gas is passed to fluidize said bed for reducing iron oxide to iron as the charge passes through said channels, each of said muffles comprising a generally rectangular shaped muffle box and a stack extending upwardly from said box for discharging combustion gases from said box, a pipe extending downwardly through said stack into said box and terminating in a burner located in said box through which burnable gas is passed, said burner having tips disposed to direct jets of said burnable gas downwardly toward the bottom of said box so that the burning gases from said tips flow against ascending combustion gases deflected from said muffle box bottom wall thereby causing said gases in said box to maintain a turbulent condition for uniformly heating the entire surface of said muffle walls, said muffle boxes providing means for transferring heat to said fluidized bed to carry on said reducing reaction without said combustion gases contacting said fluidized bed and said stacks providing means for discharging the combustion gases from said furnace without coming in contact with said fluidized bed.

11. A method of producing sponge iron from iron oxide containing material which comprises intermixing said material in comminuted form with comminuted burnt lime in the form of CaO to form a charge, preheating the charge, passing a reducing gas upwardly into said charge to fluidize said charge, passing the charge as a moving fluidized bed horizontally through an elongate horizontal channel within a reducing chamber having muffles therein adjacent said channel, maintaining said bed of charge as it passes through said channel in fluidized state by passing upwardly into said charge a hydrocarbon reducing gas containing a substantial portion of methane which reducing gas reacts endothermically with the iron oxide in said charge to reduce it to iron and which hydrocarbon gas is reformed to produce bed gases containing CO, $CO_2$ and $H_2O$, the oxygen for which is derived from the oxides in said bed of charge, passing said reformed gases from said fluidized bed and cleaning them, recycling at least a part of said cleaned reformed bed gases through said horizontally moving fluidized bed together with new hydrocarbon reducing gas without adding oxygen thereto from an external atmospheric source, and burning at least a part of said reformed bed gases in said muffles in said reducing chamber and causing the heat of combustion to pass through the walls of said muffles into said bed to supply heat necessary to carry on said endothermic reaction without the gases of combustion coming in contact with said fluidized bed, passing the charge from said reducing chamber, separating the comminuted CaO from the iron product and recycling said CaO together with new iron oxide material through said reducing chamber.

12. A method according to claim 11 in which the hot gases of combustion produced in said muffles are utilized for preheating said charge prior to passing it into said reducing chamber.

13. A method according to claim 11 in which water vapor is removed from the reformed bed gases prior to recycling and the amount of reformed gases recycled is adjusted by regulating the percentage of $CO_2$ in the bed gases leaving the fluidized bed.

14. A method according to claim 13 in which the amount of reformed bed gases recycled is that amount which will maintain in said bed gases leaving the fluidized bed an amount of $CO_2$ amounting to at least two and one half per cent by volume.

15. A method according to claim 14 in which the amount of $CO_2$ in the bed gases leaving the fluidized bed is maintained within the range of 4 to 6 percent and the temperature of the walls of said muffle boxes is maintained above 1650° F.

References Cited in the file of this patent

UNITED STATES PATENTS

| | | |
|---|---|---|
| 2,307,997 | Dill | Jan. 12, 1943 |
| 2,399,984 | Caldwell | May 7, 1946 |
| 2,481,217 | Hemminger | Sept. 6, 1949 |
| 2,711,368 | Lewis | June 21, 1955 |
| 2,752,234 | Shipley | June 26, 1956 |
| 2,758,021 | Drapeau et al. | Aug. 7, 1956 |